(12) United States Patent
Blanchot et al.

(10) Patent No.: US 6,439,798 B1
(45) Date of Patent: Aug. 27, 2002

(54) ELECTRICAL APPARATUS ADAPTED TO BE EMPLACED IN A SUPPORT

(75) Inventors: Michele Blanchot, Cravent; Georgette Nudelmont, Neuilly sur Seine, both of (FR)

(73) Assignee: Professional General Electronic Products, Courbevoie (FR)

( * ) Notice: Subject to any disclaimer, the term of this patent is extended or adjusted under 35 U.S.C. 154(b) by 0 days.

(21) Appl. No.: 09/455,404

(22) Filed: Dec. 6, 1999

(30) Foreign Application Priority Data

Dec. 4, 1998 (FR) .............................. 98 15327

(51) Int. Cl.[7] .............................................. H01R 13/74
(52) U.S. Cl. ........................ 403/329; 403/326; 439/354
(58) Field of Search ................................ 403/326, 329; 439/354, 489, 544

(56) References Cited

U.S. PATENT DOCUMENTS

| | | | | |
|---|---|---|---|---|
| 4,850,735 A | * | 7/1989 | Hansen et al. | 403/329 X |
| 5,163,848 A | * | 11/1992 | Maeda et al. | 439/354 X |
| 5,328,288 A | | 7/1994 | Masuda | 403/329 |
| 5,788,347 A | * | 8/1998 | Rabinovitz | 403/329 X |
| 5,816,733 A | * | 10/1998 | Ishikawa et al. | 403/329 |
| 5,898,172 A | * | 4/1999 | Masuie et al. | 403/329 X |

FOREIGN PATENT DOCUMENTS

| | | |
|---|---|---|
| DE | 41 16 218 | 11/1992 |
| DE | 93 13 599 | 11/1993 |
| EP | 0 844 714 | 5/1998 |
| GB | 2 105 922 | 3/1983 |
| GB | 2 106 722 | 4/1983 |
| GB | 2 211 365 | 6/1989 |
| GB | 2 264 595 | 9/1993 |

\* cited by examiner

*Primary Examiner*—Lynne H. Browne
*Assistant Examiner*—Ernesto Garcia
(74) *Attorney, Agent, or Firm*—Young & Thompson

(57) ABSTRACT

Electrical apparatus (1) to be emplaced on a support, has a front surface (11) and carries at least one securement (4) adapted to coact, in an active position, with a flange (21) of the support (2) to ensure the holding of the apparatus (1) in this support. The securement (4) can be retracted from that active position by introducing a disassembly tool (3) into a slot (18) provided for this purpose in the front surface (11) of the apparatus (1). The securement (4) has a free end disposed adjacent the front surface (11) and has an inclined plane (44) such that the movement of the tool (3) results in a movement in a direction orthogonal to the free end of the securement (4) tending to space it from its active position in the direction of its retracted position.

8 Claims, 6 Drawing Sheets

ELECTRICAL APPARATUS ADAPTED TO BE EMPLACED IN A SUPPORT

BACKGROUND OF THE INVENTION

The present invention relates generally to an electrical apparatus adapted to be disposed in a support such as a rail, a trough, a closet, a plate disposed on a piece of furniture.

Such apparatus can be adapted for the distribution of electrical energy (strong current: 230 volts), to carry out all types of functions such as control, management, safety, etc., to carry communication signals usually called low voltage.

It is difficult to evaluate during construction of dwellings and professional buildings, the ultimate needs of the occupants. It is known for example that the electrical installations of existing buildings, whether they be for private use or professional use, generally have an insufficent number of outlets and points of connection to the telecommunication network, or that the latter are poorly positioned in the rooms relative to the implementation envisaged during a meeting.

During the production of an electrical installation, the installer selects the apparatus having the functions which are necessary for him and arranges them in a support such as a rail, a trough, which can for example be fixed along a wall in the manner of a baseboard or to constitute a mast for electrical distribution, or a cabinet.

This arrangement is also true for the less usual electrical apparatus.

There have first been proposed electrical apparatus, comprising apparatus which are electrically connected or if desired mechanically connected to each other to form an assembly that is inserted into a support in the form of a rail by one open end of the latter and emplaced by sliding in the rail.

The rapid development of technology, the maintenance, reconfiguration, redefinition of cables, the addition of control apparatus, etc. require rapid and permanent access to such apparatus accommodated in a support, rail, beam, post, baseboard, derivative housing, table, distribution or distribution cabinet.

These ultimate arrangements are difficult to provide in apparatus introduced by sliding because it is necessary to have at the end of the rail a space necessary to withdraw them from the support. Measures such as adaptation of these assemblies or adjustment to new needs, the exchange of lightning rods that have been destroyed by lightning, are therefore wrong.

This is why it has been proposed to introduce apparatus through the open front surface of the support. To this end, the securement means adapted to bear on the internal walls of the support have been disposed on the apparatus. These securement means are usually moved between an active position, in which they ensure the maintenance of the apparatus in the support, and a retracted position, in which they promote the withdrawal of the apparatus, by means of control means such as screws or levers.

In certain installations, the control means of the securement means act from a side surface of the apparatus, for which they remain accessible when the apparatus is emplaced in its support, it is then necessary to have said apparatus project in front of said support.

In other constructions, the securement means are accessible from the front after having be mounted the safety and/or decorative plates.

Another drawback of the known apparatus arises from the fact that the securement means that they carry do not permit fixing them in a support other than in a predefined direction. When it is desired to position them in a support disposed at a right angle relative to this predetermined direction, the direction of use of the function carried by the apparatus will be turned by 90° relative to the usual direction.

SUMMARY OF THE INVENTION

The present invention proposes an arrangement that will be simple and easy to use, permitting solving these problems, and in which access is had to the securement means from the front surface of the apparatus and without having to disassemble the assembled finishing elements, which permits encasing said apparatus in its support and thus making installations that are easily modifiable and of improved appearance.

To this end, the invention relates to an electrical apparatus adapted to be emplaced in a support, comprising a front surface and carrying at least one securement means adapted to coact, in an active position, with a flange of said support to ensure holding said apparatus in this support, characterized in that said securement means can be withdrawn from said active position by introducing a disassembling tool into slot provided for this purpose in said front surface and in that said securement means has a free end disposed adjacent the front surface and having an inclined plane such that the movement of the tool produces a movement in an orthogonal direction of the free end of said securement means, tending to space it from its active position in the direction of its retracted position.

The apparatus according to the invention is further noteworthy in that:

the securement means is constituted by a tongue carried by a sidewall disposed perpendicularly to the front surface and adjacent the edge of the latter, the tongue is defined by a cutout provided in the sidewall, the side of said cutout which is farthest from the front surface not being open, so as to constitute the foot by which the tongue is connected to the sidewall, each tongue carries a projection extending beyond its surface turned toward the exterior of the apparatus, said projection comprising an upper surface perpendicular to the wall of the tongue and turned toward the free end of the latter, adapted to bear against the end of a support flange to ensure the holding of the apparatus in the support when the tongue is in its active position, each slot overlies one tongue and is disposed transversely relative to the plane of this tongue, securement means and slots permitting their actuation with the aid of a tool are provided on the four sides of the apparatus, the apparatus comprises a front surface and four angled posts each comprised by two sidewalls carrying tongues, said sidewalls extending respectively over two sides perpendicular to each other of the front surface and being disposed adjacent a same angle of said front surface, the lower surface of the front surface carries a projection behind which is brought the inclined plane of the securement means when the latter is in a retracted position, the disassembly tool is constituted by a sleeve and a flat tip adapted to penetrate a slot in the front surface, the tip of the tool is tapered and has a first edge parallel to the sleeve and a second oblique edge forming an angle with the first.

BRIEF DESCRIPTION OF THE INVENTION

The invention will be better understood from the description which follows, given by way of non-limiting example, with reference to the accompanying drawings, in which.

DESCRIPTION OF THE PREFERRED EMBODIMENTS

Figure 1:
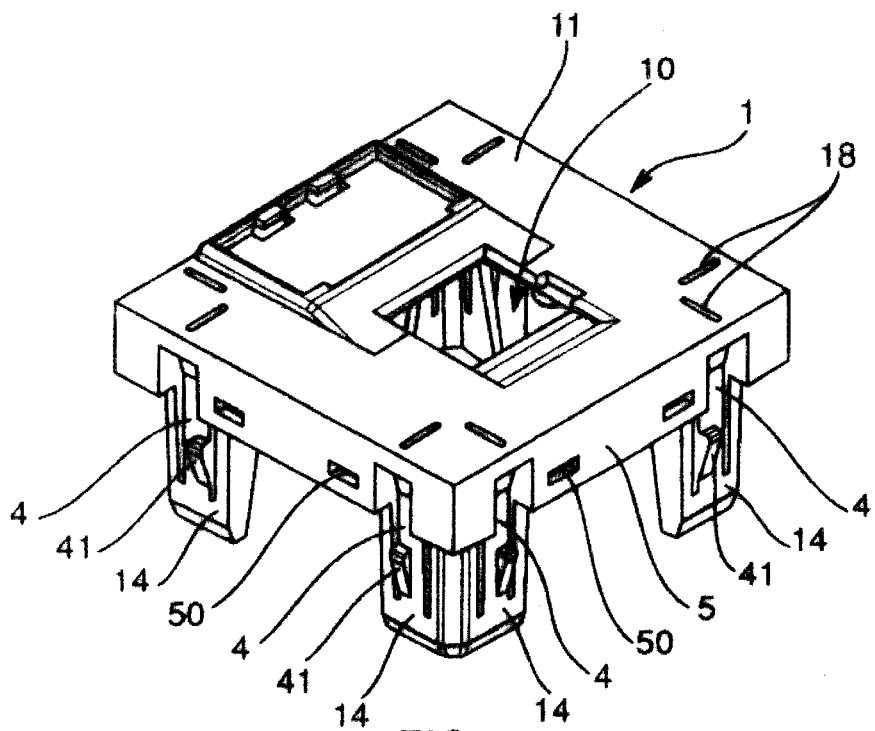
FIG. 1 is a top perspective view of an apparatus according to a first embodiment of the invention.

In the embodiment shown in FIG. 1, the apparatus 1 has a connector 10 on its front surface 11, said connector 10 being adapted to be used for telephony. In a manner known per se, and not shown in the drawing, the front surface 11 of the apparatus can carry any other type of connector or a functional element such as electrical sockets according to the standard to which they are subject, switches, signals, circuit breakers, etc.

Figure 2:
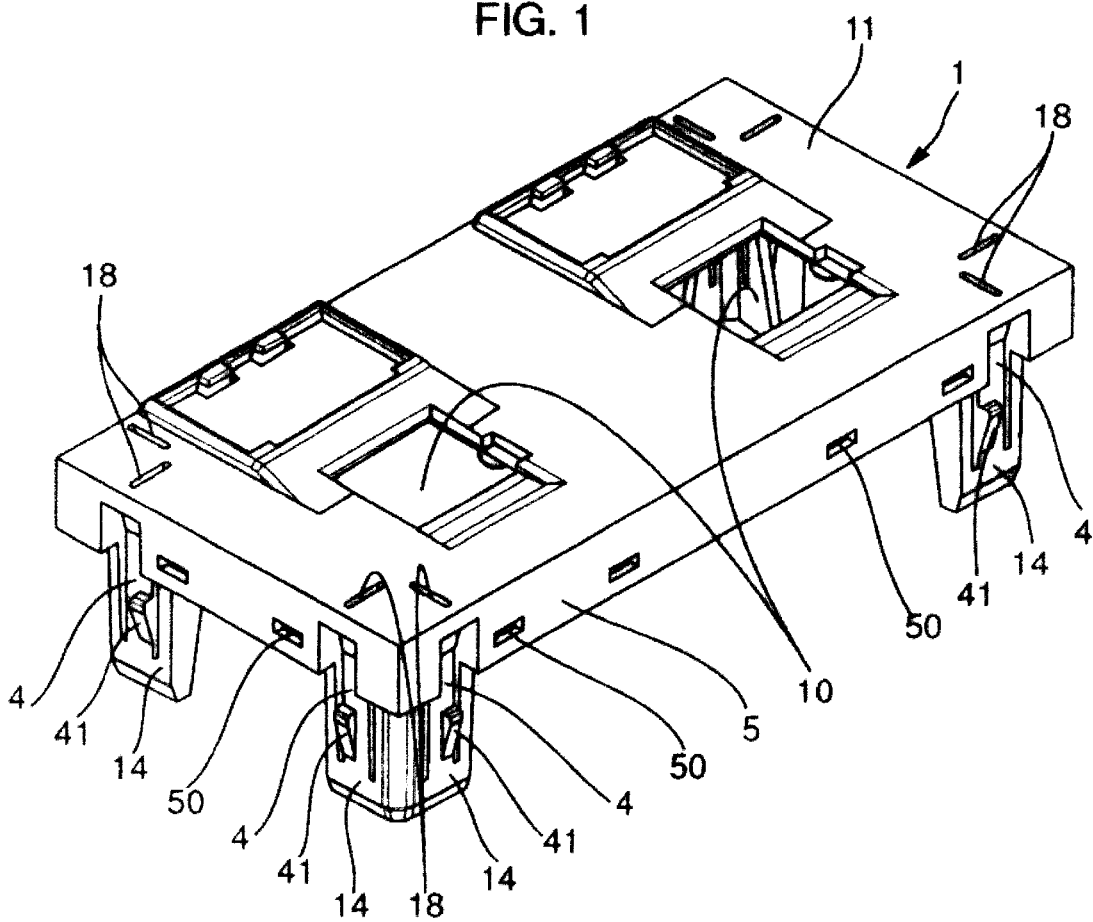
FIG. 2 is a view similar to FIG. 1 of an apparatus according to a second embodiment of the invention.
Figure 3:
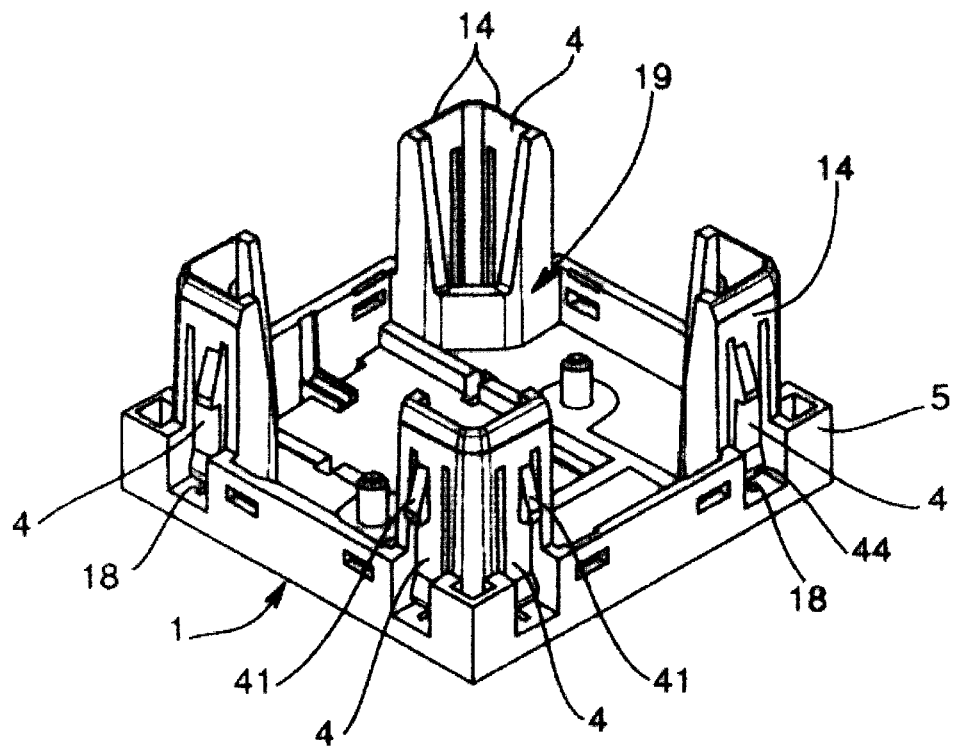
FIG. 3 is a bottom perspective view of the apparatus of FIG. 1.

By way of example, the apparatus 1 shown in FIG. 2 is an apparatus whose front surface 11 carries two connectors So as not to complicate the drawings, the apparatus is represented in a simplified manner, all the elements unnecessary to the comprehension of the invention, such as those concerning the circulation and distribution of current to the functional element, having been omitted.

In the embodiment shown in the drawings, the front surface 11 has a peripheral skirt 5 traversed by openings 50 adapted to permit the attachment of a housing (not shown) enclosing various connection means of the connector 10.

Figures 6A, 6B:
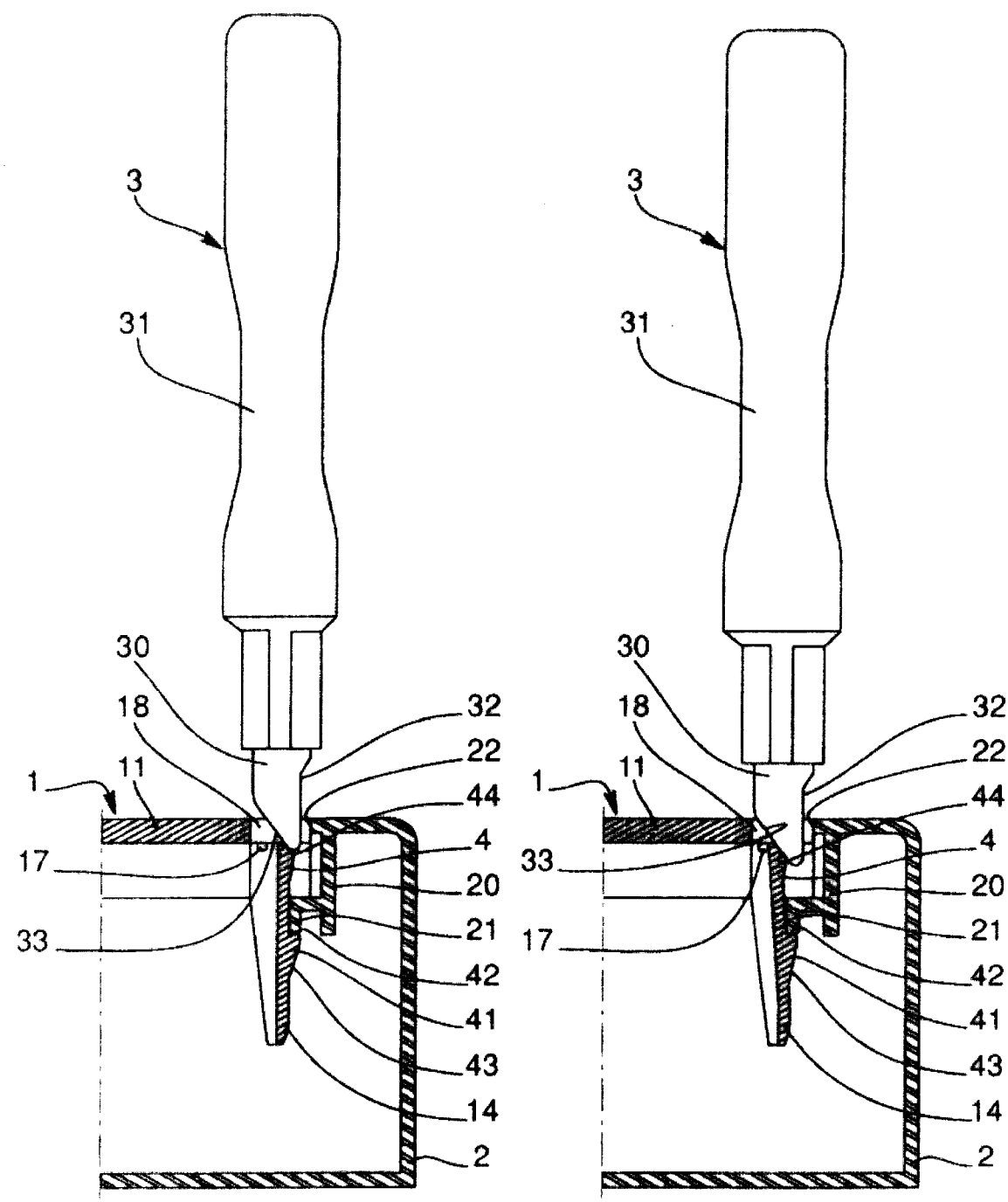
FIGS. 6a to 6c are half views in cross-section showing three phases of extraction from a housing of an apparatus according to the invention.
Figure 6C:
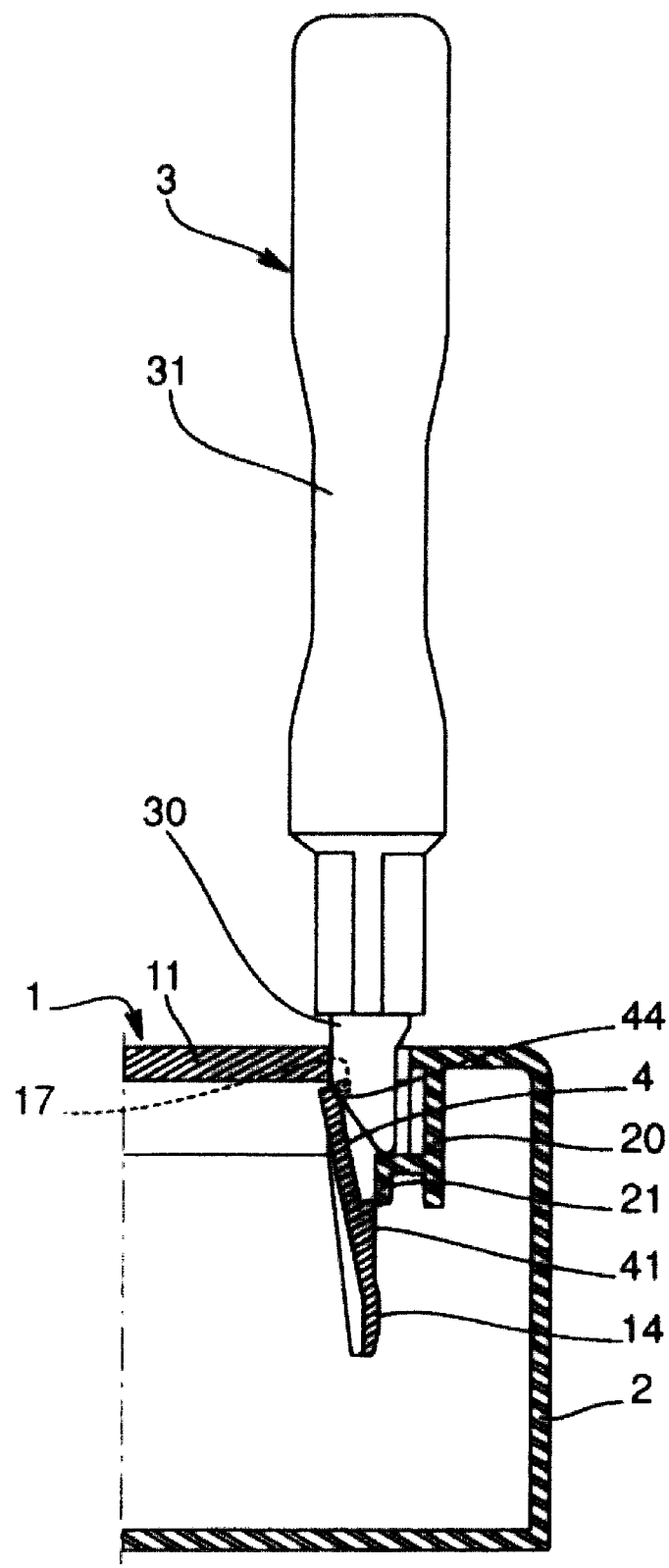

This apparatus 1 is adapted to be positioned in a support 2 such as the rail 2 shown by way of example in FIGS. 6a to 6c.

This rail 2 constituting the support for the emplacement of the apparatus 1 has on its front surface a longitudinal opening 22 of a transverse size equal to the width of the apparatus 1. This longitudinal opening 22 extends along a wall 20 having a flange 21 that helps hold the apparatus in the support as will be described later.

The apparatus 1 has securement means 4 adapted to coact with said flange 21.

As shown in the drawings, said securement means 4 are constituted by tongues 4 cut out from the sidewalls 14 of the apparatus 1 disposed perpendicular to the front surface 11 and adjacent the edge of the latter; said sidewalls 14 can constitute a sort of angle post as shown in the drawing, or the walls at least partially enclosing the space below the front surface of the apparatus 1 so as to constitute a housing in which are disposed the elements necessary for the circulation and distribution of current.

Figure 4:
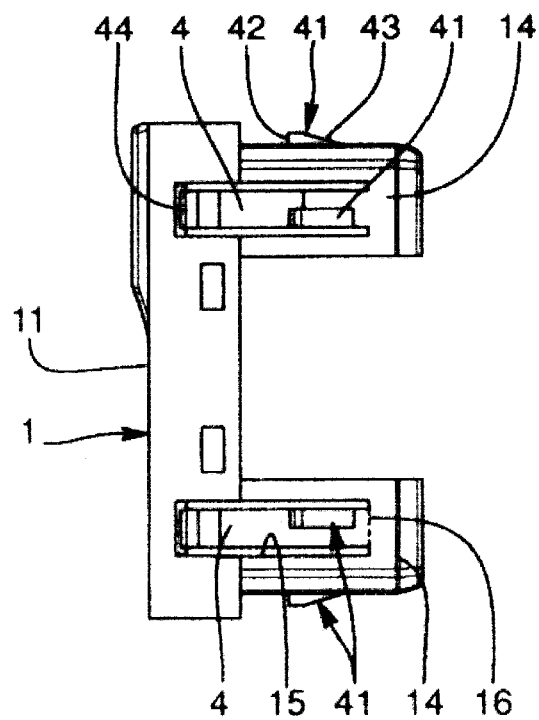
FIG. 4 is a side view of the apparatus of FIG.
Figure 5:
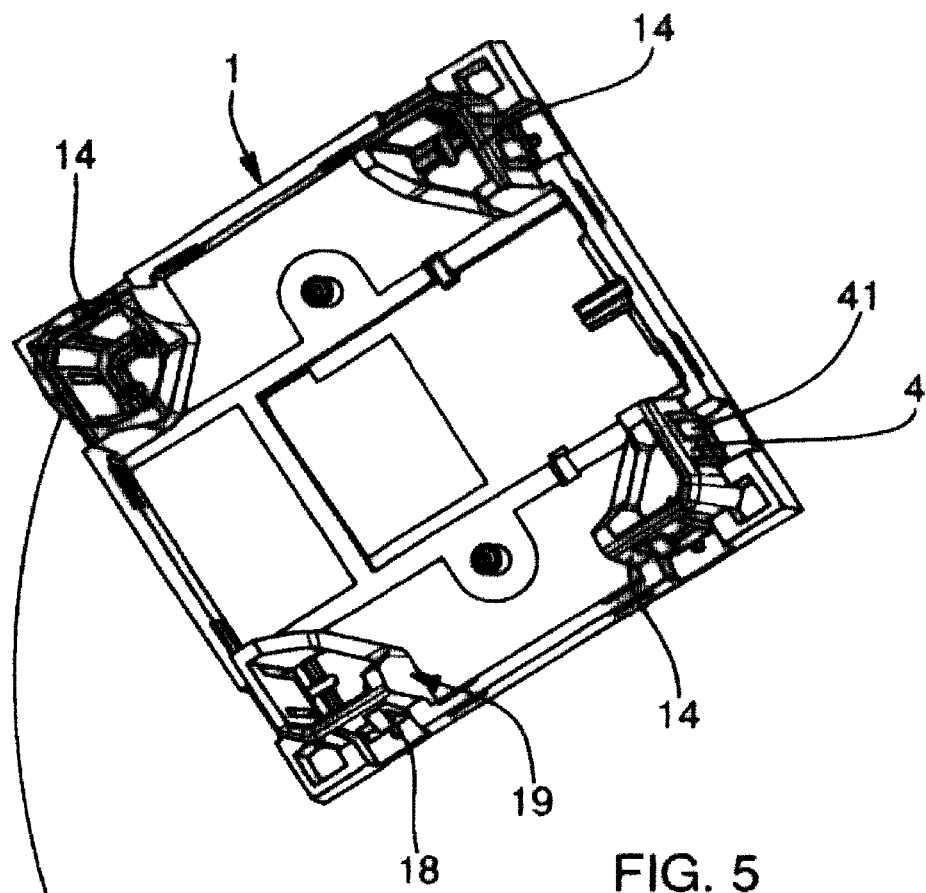
FIG. 5 is a perspective view showing the rear surface of the apparatus of FIG. 1, with the detail V enlarged.
Figure 5:
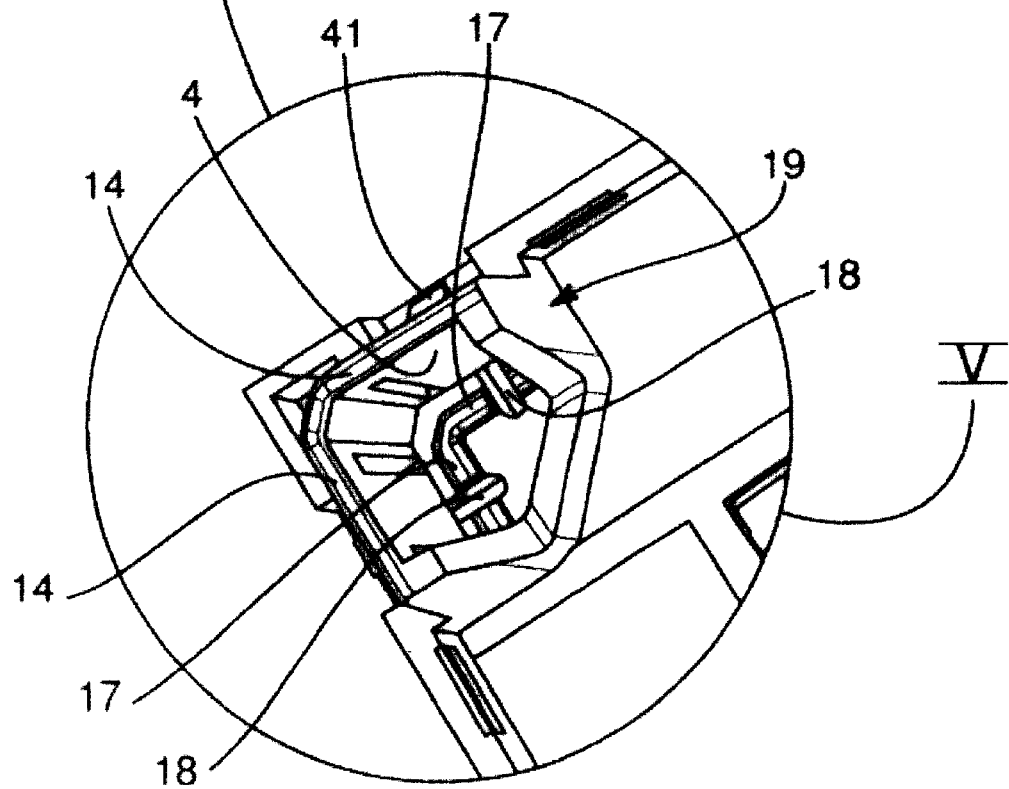

In the embodiment shown in the drawings, the sidewalls 14 are positioned adjacent the corners of the front surface 11. Two sidewalls 14 extending respectively below two sides perpendicular to each other of the front surface"and disposed adjacent a same corner of said front surface," are connected by a wall 19. The apparatus 1 is thus comprised by a front surface 11 carrying the connector 10 and four angle posts, open, each comprising two sidewalls 14 carrying tongues The tongues 4 are defined by cutouts 15 provided in the sidewalls 14. The side 16, shown in narrow line in FIG. 4, of said cutouts 15, which is the farthest from the front surface 11, is not open; it constitutes the foot by which the tongue 4 is connected to the sidewall 14. The end of the tongues 4 which is disposed adjacent the front surface 11 is free.

The apparatus according to the invention is made of plastic material, for example by molding.

The resiliency of the plastic material used gives to the tongues 4 cut out from the sidewalls 14 the possibility of flexible displacement relative to the wall 14 about an imaginary axis constituted by the side 16 of the cutout 15 that is not open. The tongues 4 can thus be pressed inwardly of the apparatus and return resiliently into their initial rest position in which they extend into the plane of the wall 14 from which they emerge. By internal space of the apparatus is meant the space provided below the front surface and within the side surfaces defined by imaginary connection of the side walls 14.

Each tongue 4 carries a projection 41 extending beyond its surface turned outwardly of the apparatus; said projection 41 is constituted by an upper surface 42 perpendicular to the wall of the tongue 4 and turned toward the free end of this latter, and by an inclined surface 43 directed toward the foot of the tongue.

In the embodiments shown in the drawings, each tongue carries a projection 41 of a thickness substantially less than the thickness of the tongue, other forms of embodiment being of course being able to be used, having a wide projection or several projections disposed parallel to each other over the width of the tongue.

As can be seen in the drawings, and more particularly in FIGS. 6a to 6c, the free end, disposed adjacent the front surface 11, of the tongues 4 has an inclined plane 44, said inclined plane being spaced from the external wall of the tongue in a direction away from the front surface 11 of the apparatus, each tongue 14 is thus of small thickness adjacent its free end, its thickness increasing when moving along the inclined plane 44 in a direction toward the foot.

As can be seen in FIGS. 6a to 6c, the opening 22 of the support 2 is of a width equal to the width of the front surface 11 of the apparatus 1 whilst the flanges 21 disposed along each edge of the opening are separated by a distance equal to the distance separating the external surfaces of the sidewalls 14 of the apparatus 1.

When apparatus 1, or an assembly of apparatuses connected to each other, is to be emplaced in the support 2, it is introduced through the opening 22 in a direction perpendicular to the latter. The sidewalls 14 slide along the flanges 21 whilst the tongues 4 are pressed inwardly of the apparatus 1 when the inclined surfaces 43 of the projections 41, come into contact with said flanges 21. At the end of the insertion movement of the apparatus 1 into the support 2, the projections 41 are completely disposed behind the flanges 21 and the tongues 4 return resiliently into their rest position in which they are disposed in the plane of the sidewalls 14. This having been done, the upper surfaces 42 of the projections 41 bear against the ends of the flanges 21 and ensure holding the apparatus 1 within the support 2. The rest position of the tongues 4 is thus also their active position in which they ensure the holding of the apparatus 1 in the support 2.

As can be seen in the drawings, the front surface 11 of the apparatus 1 is in the plane of the open surface of the support, said apparatus being completely encased in said support.

According to the invention, it is possible to act on the tongues 4 from the front surface 11 of the apparatus 1 to withdraw this apparatus 1 from the support 2 without having first to disassemble other elements such as positioning elements.

To this end, the slots 18 are formed in said front surface 11 of the apparatus, above each tongue 4.

Each of the slots 18 is disposed transversely relative to the plane of the tongue 4 that it overlies, hence parallel to the direction according to which the tongue 4 must move during its flexure about the imaginary axis 16 formed by its foot.

To withdraw a tongue 4 from its active position, a disassembly 3 is introduced into the slot 18 disposed above each tongue, as shown in FIGS. 6a to 6c.

This tool is for example constituted by a handle 31 and a flat tip 30, of a thickness such that it can enter the slot 18 of the front surface 11. As a modification, a tool having two or more different tips could be provided to permit the disassembly of different apparatus whose means are of different shapes or dimensions.

In the embodiment shown in the drawings, the slots 18 are very narrow rectangular slots so as to take care of the security requirements such that foreign bodies cannot be introduced into the apparatus.

In the example shown in the drawing, the tip 30 is tapered, it has a first edge 32 parallel to the handle 31 and a second oblique edge 33 forming an acute angle with the first.

As shown in FIG. 6a, the slot 18 is of a size such that the point of the tip 30 of the tool 3 can be inserted between the edge of the slot 18 and the external wall of the tongue 4, the tip 30 being disposed with its first edge 32 against the end of the slot 18 and its second oblique edge 33 against the inclined plane 44 of the tongue 4.

During insertion of the tool 3, the oblique edge 33 of the tip 30 slides on the inclined plane 44 of the tongue 4 and acts on the latter to space said tongue 4 in the direction of its retracted position. The movement of the tool 3 induces a movement in an orthogonal direction of the free end of the tongue 4, tending to space the latter from its active position, in the direction of its retracted position.

FIG. 6b shows the positions of the tool 3 and the tongue 4 in the course of this movement.

FIG. 6c shows the position of the different elements at the end of the insertion of the tool 3.

The lower surface of the front surface 11 of the apparatus carries a projection 17 behind which is brought the end of the tongue 4, which is to say the inclined plane 44, when the latter is in its retracted position.

The positioning of the end of the tongue 4 behind the projection 17 permits immobilizing it in a retracted position in which it is maintained by the resilience inherent in its construction. In this position, the projection 41 is disengaged from the flange 21 of the support 2, which permits withdrawing the apparatus or the assembly constituted by several apparatus, from said support.

The projection 17 is of course discontinuous in line with the slot 18, it is present on opposite sides of said slot.

When the apparatus 1 must be again positioned in a support, it suffices to retract the tongues outwardly of the apparatus so as to disengage the inclined plane 44 of the latter from the projections 17. This manipulation can be carried out manually or with any elongated tool, a screwdriver or the disassembly tool 3.

As can be seen from a reading of the above description, the manipulations necessary to disassemble the apparatus from the support come down from the introduction of the tool 3 into each slot 18 of the front surfaces 11.

These manipulations are rapid and simple to carry out.

Preferably, these manipulations are performed solely from the front surface of the apparatus 1. It is thus possible to position the apparatus 1 with its front surface 11 in the plane of the opening 22 of the support, as shown in the drawings. There is thus obtained a mounting of more pleasing appearance because it has no projections.

It is possible to use the slots 18 to position a snap engagement of the decorative elements or the indicating elements which will be removed when the apparatus is to be withdrawn from the support.

According to another aspect of the invention, tongues 4 and slots 18 permitting their actuation with the aid of a tool 3 are provided on the four sides of the apparatus 1. This arrangement is particularly interesting when the apparatus can be emplaced any desired way in the supports 2, which can be horizontal baseboards or vertical posts.

Thus, when the securement means of the apparatus to the support are provided only on two sides of said apparatus, as is generally the case at present, the connectors are disposed at 90° relative to their normal position when the apparatus is emplaced in a post.

Figure 7A:
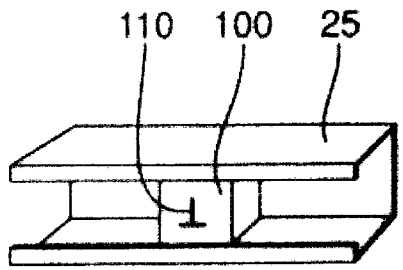
FIGS. 7a to 7e show different uses of an apparatus.
Figure 7B:
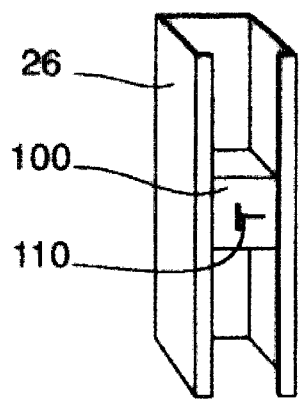

This is shown in FIGS. 7a and 7b.

FIG. 7a shows schematically an apparatus 100 having a connector 110 such as a telephone jack of the French standard, emplaced in a support 25 disposed horizontally to form a baseboard. It will be seen that the connector 10 is present as a T, but upside down, which is to say with the crossbar lowermost.

In known apparatus, such an apparatus 110 has securement means along its two sides disposed parallel to the crosspiece of the connector 110. Because of this, when the apparatus 100 is positioned in a support 26 disposed vertically to form a post, as shown in FIG. 7b, the connector 110 is positioned at a right angle relative to its usual known position, which is that of FIG. 7a, to position the connector in the usual known position it is necessary to add adaptor elements secured in the vertical support to constitute an intermediate horizontal support.

Figure 7C:
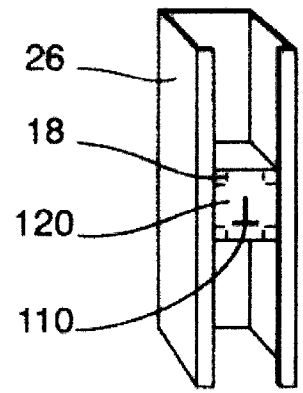

The apparatus 120 according to the invention which has tongues 4 on its four sides, can be disposed as shown in FIG. 7c with the connector 110 in its usual position without requiring the use of adaptor elements.

Figure 7D:
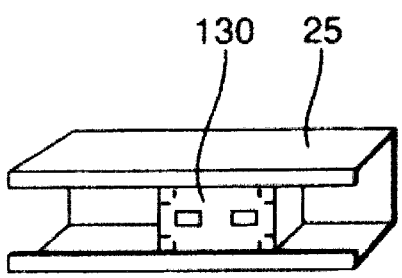
Figure 7E:
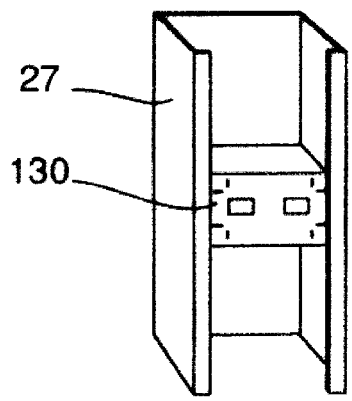

When the apparatus 130 has dimensions of width and length that are very different, such as those of FIG. 2, it suffices to adapt the width of the support 27 to be able to position it in a vertical support such as that shown in FIGS. 7d and 7e while maintaining its normal direction of use.

As will be understood, the apparatus according to the invention is particularly interesting on the one hand because it permits easy emplacement in and withdrawal from a support, and, on the other hand, because it can be emplaced in the support in a suitable direction for operation of the connector that it carries.

What is claimed is:

1. A combination of a support and an electrical apparatus for emplacement in said support, said support comprising:

a front surface arranged and adapted for insertion of said apparatus;

a back surface; and at least one flange adjacent to said front surface and between said front and back surfaces; said apparatus comprising:

at least one securement means, coacting, in an active first position, with said at least one flange of said support to hold said apparatus in said support when said apparatus is inserted into said front surface of said support; and a front surface comprising a slot in registration with said at least one securement means;

said at least one securement means having a free end adjacent said front surface of said apparatus, said at least one securement means being movable in a direction orthogonal to said at least one flange to move said at least one securement means from said active first position to a retracted second position, wherein said at least one securement means comprises a tongue carried by a sidewall, said sidewall being perpendicular to said front surface of the apparatus and adjacent to an edge of said front surface of said apparatus, wherein said sidewall has a cut-out defining said tongue, a side of said cut-out located farthest from said front surface of said o apparatus, being closed to comprise a foot connecting said tongue to said sidewall.

2. The combination according to claim 1, wherein said tongue has a projection extending outwardly of said apparatus, said projection having an upper surface perpendicular to said sidewall and facing a free end of said tongue, said projection bearing against an end of said at least one flange to hold said apparatus in said support when said tongue is in said active first position.

3. The combination according to claim 1, wherein said slot overlies said at least one securement means and said slot is transverse relative to a plane of said at least one securement means.

4. The combination according to claim 1, wherein at least one said securement means and at least one said slot are on each of four sides of said apparatus.

5. A combination of a support and an electrical apparatus for emplacement in said support, said support comprising:

a front surface arranged and adapted for insertion of said apparatus;

a back surface; and at least one flange located adjacent to said front surface and between said front and back surfaces;

said apparatus comprising:

at least one securement means coacting, in an active first position, with said at least one flange of said support to hold said apparatus in said support when said apparatus is inserted into said front surface of said support; and a front surface comprising a slot in registration with said at least one securement means;

said at least one securement means having a free end adjacent said front surface of said apparatus, said at least one securement means being movable in a direction orthogonal to said at least one flange to move said at least one securement means from said active first position to a retracted second position, wherein at least one said securement means and at least one said slot are on each of four sides of said apparatus, wherein said at least one securement means further comprises four angled posts each comprising two sidewalls said sidewalls extending respectively below two sides of said front surface of said apparatus, said two sides being perpendicular to each other and being disposed adjacent a corner of said front surface of said apparatus.

6. The apparatus according to claim 1, wherein a lower surface of said front surface of said apparatus comprises a projection and wherein said at least one securement means comprises an inclined plane, said inclined plane engaging said projection to hold said at least one securement means in said retracted second position.

7. A combination of a support and an electrical apparatus for emplacement in said support, said support comprising:

a first surface arranged and adapted for insertion of said apparatus; and a plurality of flanges, said apparatus comprising:

a front surface having slots; and four angled posts each comprising two sidewalls, each of said sidewalls comprising a tongue, said sidewalls extending respectively below two sides of said front surface, being perpendicular to each other and being disposed adjacent a corner of said front surface;

said slots being in registration with respective ones of said tongues;

said tongues coacting, in an active first position, with said plurality of flanges to hold said apparatus in said support, when said apparatus is inserted into said first surface of said support;

said tongues each having a free end adjacent to said front surface so as to be movable in a direction orthogonal to respective ones of said flanges to move said tongues from said active first position to a retracted second position.

8. The apparatus according to claim 5, wherein a lower surface of said front surface of said apparatus comprises a projection and wherein said at least one securement means comprises an inclined plane, said inclined plane engaging said projection to hold said at least one securement means in said retracted second position.

* * * * *